United States Patent [19]

Fesman

[11] Patent Number: 4,616,044
[45] Date of Patent: Oct. 7, 1986

[54] HEAT LAMINATABLE POLYETHER URETHANE FOAM

[75] Inventor: Gerald Fesman, Teaneck, N.J.

[73] Assignee: Stauffer Chemical Company, Westport, Conn.

[21] Appl. No.: 695,016

[22] Filed: Jan. 25, 1985

[51] Int. Cl.<sup>4</sup> ............... C08G 18/14; G08G 18/48; B32B 31/20; B32B 5/14
[52] U.S. Cl. ................... 521/107; 156/308.2; 428/305.5; 428/308.4; 521/108; 521/906
[58] Field of Search .............. 521/107, 108, 906

[56] References Cited

U.S. PATENT DOCUMENTS

| 3,131,105 | 4/1964 | Codos | 156/309.3 |
|---|---|---|---|
| 3,142,650 | 7/1964 | Friedman | 521/169 |
| 3,142,651 | 7/1964 | Friedman | 521/169 |
| 3,205,120 | 9/1965 | Flanders | 521/169 |
| 3,310,609 | 3/1967 | Baranauckas et al. | 521/107 |
| 3,429,837 | 2/1969 | Langrish et al. | 521/107 |
| 3,497,416 | 2/1970 | Critchfield et al. | 521/174 |
| 3,772,222 | 11/1973 | Steward et al. | 521/107 |
| 4,113,671 | 9/1978 | Lecolier et al. | 521/108 |
| 4,133,846 | 1/1979 | Albright | 521/107 |
| 4,135,042 | 1/1979 | Lickei et al. | 521/107 |
| 4,328,321 | 5/1982 | Haas et al. | 521/108 |
| 4,365,026 | 12/1982 | Pawlowski et al. | 521/107 |

Primary Examiner—Herbert S. Cockeram
Attorney, Agent, or Firm—Hensley M. Flash

[57] ABSTRACT

Polyether urethane foams that are heat laminatable are prepared by incorporating within the foam an effective amount of an organophosphorus additive. This organophosphorus additive can be an organophosphite, an organophosphonate, an organophosphate, and a mixture thereof. This foam can also include an halogenated flame retardant.

18 Claims, No Drawings

HEAT LAMINATABLE POLYETHER URETHANE FOAM

BACKGROUND OF THE INVENTION

1. Field of the Invention

This invention relates to laminates of a substrate and polyether urethane foam, and particularly to such laminates that are produced by heat sealing. More particularly, the invention relates to urethane foam laminates wherein the urethane foam is treated with a phosphorus-containing additive.

2. Related Information

In the preparation of many articles which employ flexible polyurethane foams, it is necessary to form an adhesive bond between the foam and a substrate such as wood, a fabric, a metal and organic plastic, etc. Heat sealing is a useful process for adhering a polyurethane foam to a substrate. In this process, the surface of a foam is heated to form a layer of tacky liquid, after which the substrate is applied to the fused surface of the foam to form a laminate. When the layer of tacky liquid cools and resolidifies, the resulting bond between the polyurethane foam and the substrate is frequently as strong or stronger than the strength of the original polyurethane foam. Heretofore, only polyester-type urethane foams were laminatable in this manner. The less expensive polyether-type urethane forms could not be heat sealed because the fused surface layer would not resolidify.

U.S. Pat. No. 3,205,120 [Flanders, Sept. 7, 1965] discloses heat sealed urethane foam laminates that are prepared from the less expensive polyether urethane foam. This patent discloses that in an otherwise conventional commercial polyether flexible urethane foam reaction mixture, a minor amount of a low molecular weight polyol selected from the group consisting of a polyoxyalkylene polyol, a hydroxyaliphatic ester of a phosphorus-containing acid and a hydroxyl-containing natural oil was included.

U.S. Pat. No. 3,497,416 [Critchfield et al., Feb. 24, 1970] discloses heat sealed urethane foam laminates prepared from polyether-based urethane foam. The urethane foam comprises the reaction product of a polyether polyol and polyisocyanate prepared by reacting dipropylene glycol or dibutylene glycol with an excess of an aromatic polyisocyanate. This patent identifies certain processing difficulties encountered in the production of polyether urethane foams as disclosed in Flanders that are caused by the high reactivity of the polyether polyol mixture used.

U.S. Pat. No. 3,131,105 [Codos, Apr. 28, 1964] discloses a method for forming a laminated structure by applying onto the surface of a polyurethane foam, a coating of an inflammable substance which when ignited will plasticize said surface, igniting said coating to plasticize the surface and then applying with pressure a layer of material with which the plasticized surface will form a bond onto the plasticized surface while the surface is soft and tacky. This method is useful for both polyesters and polyether urethane foams, however, it does not disclose the use of any additives within these foams.

U.S. Pat. No. 3,142,650 [Friedman, July 28, 1964] discloses the preparation of polyurethanes from phosphite esters containing available secondary hydroxyl groups, for example a tris-polypropylene glycol phosphite. This patent does not disclose heat sealable polyether urethane foam laminates.

U.S. Pat. No. 3,142,651 [Friedman, July 28, 1964] discloses the preparation of polyurethanes from phosphite esters containing available hydroxyl groups, preferably secondary hydroxyl groups. The patent also discloses the preparation of polyurethanes from the corresponding thiophosphate esters, phosphate esters and certain phosphonates. This patent does not disclose heat sealable polyether urethane foam laminates.

U.S. Pat. No. 4,135,042 [Lickei et al., Jan. 16, 1979] discloses the use of phosphites as scorch inhibitors in polyurethane foams containing halogenated phosphate polyester additives. Again this patent does not disclose heat sealable polyether urethane foam laminates.

SUMMARY OF THE INVENTION

This invention is a heat laminatable polyether urethane foam composition which comprises at least one organophosphorus additive said additive being effective to impart heat laminatable properties to the resulting foam. The organophosphorus additive can be an organophosphite, an organophosphonate, and an organophosphate. The organophosphite can be selected from the group consisting of diphosphites, pentaerythritol diphosphites, alkyl phosphites and aryl phosphites. The composition can further comprise an halogenated flame retardant. This urethane foam composition can be used to prepare a laminated structure which comprises at least one layer of the resulting flexible polyether urethane foam heat sealed to a substrate.

An object of this invention is to provide laminated structures having at least one layer comprising a flexible polyether urethane foam that is heat sealable to a substrate without encountering the processing difficulties encountered in the production of the Flanders polyether urethane foam that are caused by the high reactivity of the polyether polyol mixture and without being limited to the reaction scheme of Critchfield which involves using aromatic isocyanates pre-reacted with diols.

A further object of this invention is to provide flame laminatable polyether urethane foams using hydroxyl and non-hydroxyl-containing organophosphorus compounds such as organophosphites, organo-phosphonates and organophosphates while using the conventional one shot technique without encountering processing difficulties.

Other objects and advantages of the present invention are described elsewhere within this specification.

DETAILED DESCRIPTION OF THE INVENTION

It has been found that urethane foam laminates having outstanding properties can be produced by heat sealing a substrate onto a particular urethane foam, fully described below. The laminates produced in accordance with this invention are produced from polyether-based urethane foam rather than from the more expensive polyester-based urethane foam.

The urethane foams that are employed in this invention can be prepared by conventional polyurethane flexible, foam-forming technology. Polyurethane foams, according to this invention, having a density of from about 16 to about 48 kilograms per cubic meter are prepared by known methods, such as the prepolymer, quasi-polymer, or one shot systems. Foams can be prepared by batch or continuous processes. The foam-forming mixtures should include as basic ingredients: (A) polyether polyol, (B) organic isocyanate, (C) blowing agent, (D) polyurethane catalyst, (E) surfactant, and (F) at least one organophosphorus additive effective to impart heat laminatable properties.

The polyether polyol ingredient (A) for the polyurethane foam composition of this invention can be selected from any of the wide variety of polyhydric polyether compounds available and conventionally used by the art for the preparation of flexible ether-type polyurethane foams. The most common polyether polyol compounds, the polyoxyalkylene polyether polyols, are generally prepared by the reaction of an alkylene oxide, such as 1,2-propylene oxide, with a polyhydric initiator or starter. The polyhydric initiator or starter can be, e.g., glycerol, trimethylolethane, trimethylolpropane, triethanolamine or a polyethylene glycol.

The alkylene oxides used in preparing the polyethers preferably are those which contain from 2 to 4 carbon atoms, e.g., ethylene oxide, 1,2-propylene oxide, 1,2-butylene oxide, trimethylene oxide and tetramethylene oxide. Also useful are the poly-(aralkylene ether)-polyols which are derived from the corresponding aralkylene oxides such as, e.g., styrene oxide, alone or mixed with an alkylene oxide. Generally, propylene oxide, that is, the 1,2-propylene oxide, and mixtures of 1,2-propylene oxide with ethylene oxide are preferred for the preparation of the polyether polyol reactant. Also useful as polyols in the practice of this invention are the so-called graft polymers, that is, polyether polyols which have been modified with acrylonitrile and/or styrene in such a way that some is grafted onto the backbone of the polyether polyol (but not on the functional, hydroxyl group) and some is present as a polymer dispersed in the polyol.

The polyethers used in the present invention preferably have molecular weights of from about 2,000 to about 6,000 and optimally from about 3,000 to about 4,500 and an average hydroxy functionality of from about 2 to about 3. There are several commercially available examples of these polyethers. One example is Niax ® 16-56 brand polyether polyol, a product of Union Carbide Corporation.

The organic polyisocyanate ingredient (B) of the foam-forming process can be selected from conventional isocyanates used for such purposes. Preferably the isocyanate has an isocyanate functionality of from 2 to 3. Useful isocyanates include aromatic, aliphatic, cycloaliphatic, heterocyclic types and mixtures thereof. Suitable organic isocyanates include toluene diisocyanate and phenylene diisocyanates, with toluene diisocyanate being preferred because of cost and availability.

The blowing agent (C) ingredient can comprise water alone or water in combination with other conventional blowing agents, such as methylene chloride, or hydrocarbons or fluorocarbons having a boiling point from about −30° C. to 60° C.

The polyurethane catalyst ingredient (D) can be selected from conventional materials. Suitable catalysts include amines such as tertiary amines and metal compounds such as stannous octoate, dibutylin dilaurate, etc.

The surfactant ingredient (E) employed in the process of this invention can be selected from surfactants conventionally used for such purposes. Although a variety of surfactants are operative in this invention, it has been found that particularly desirable uniform cell structure and appearance can be given to the foam if a silicone surfactant is used, e.g., Union Carbide Corporation TM L5810 and L5740 nonhydrolyzable silicone surfactants.

The polyether urethane foam composition of this invention is rendered heat laminatable by the inclusion of at least one organophosphorus additive (F), said additive being effective to impart heat laminatable properties. This organophosphorus additive is derived from phosphorus containing acids, for example, organophosphites derived from phosphorous acid, organophosphonates derived from phosphonic acid, and organophosphates derived from phosphoric acid.

Suitable organophosphites can include diphosphites, pentaerythritol diphosphites, alkyl phosphites, aryl phosphites, and other phosphites.

Suitable diphosphites are of the general formula:

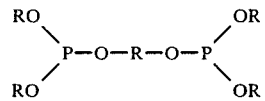

Where R is selected independently each time it occurs from the group consisting of alkyl having 1 to 20 carbon atoms inclusive and preferably 1 to 10 carbon atoms inclusive; and haloalkyl having 1 to 20 carbon atoms inclusive and preferably 1 to 10 carbon atoms inclusive. Where R is an haloalkyl, the chloroalkyl is preferred.

Suitable pentaerythritol diphosphites are of the general formula:

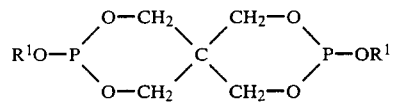

where $R^1$ is selected independently each time it occurs from the group consisting of alkyl having 1 to 18 carbon atoms inclusive and preferably having 1 to 10 carbon atoms inclusive; and phenyl and substituted phenyl wherein the substituents are selected from the group consisting of alkyl having 1 to 4 carbon atoms. Some preferred examples include diisodecyl pentaerythritol disphosphite where $R^1$ is alkyl having 10 carbon atoms; distearyl pentaerythritol disphosphite where $R^1$ is alkyl having 18 carbon atoms; and bis(2,4-di-t-butylphenyl)-pentaerythritol diphosphite.

Suitable alkyl phosphites are of the general formula $(R^2O)_3P$ where $R^2$ is selected independently each time it occurs from alkyl having 1 to 20 carbon atoms inclusive and preferably 3 to 18 carbon atoms inclusive. Some preferred examples include triisodecyl phosphite, triisoctyl phosphite, trilauryl phosphite and tristearyl phosphite.

Suitable aryl phosphites are of the general formula $(R^3O)_3P$ where $R^3$ is selected independently each time it occurs from the group consisting of aryl and substituted aryl wherein the substituents are alkyl having 1 to 10 carbon atoms inclusive; and alkyl having 1 to 10 carbon atoms inclusive. Some preferred examples include triphenyl phosphite, alkyl derivatives of triphenyl phosphite, diphenyl isodecyl phosphite, phenyl diisodecyl phosphite, diphenyl isooctyl phosphite and octyl diphenyl phosphite.

Another suitable phosphite can include tri(beta-chloroethyl)phosphite (FYROL ® TBCEP brand of Stauffer Chemical Company).

Suitable organophosphonates can include di(polyoxyethylene)hydroxymethyl phosphonate (VICTAS-TAB®HMP brand flame retardant intermediate of Stauffer Chemical Company), diisopropyl-N,N-bis(2-hydroxyethyl)aminomethyl phosphonate (FYROL® 7 brand flame retardant of Stauffer Chemical Company), diethyl-N,N-bis(2-hydroxyethyl)aminomethyl phosphonate (FYROL® 6 brand flame retardant of Stauffer Chemical Company), diisopropyl-N,morpholine-aminomethyl phosphonate (FYROL® 7M brand flame retardant of Stauffer Chemical Company) and bis(beta-chloroethyl)beta-chloroethyl phosphonate (FYROL®BBCEP brand flame retardant of Stauffer Chemical Company). The first three phosphonates listed immediately above all contain hydroxyl groups, however these phosphonates, like the others, are useful in imparting heat laminatable properties to the polyether urethane foam compositions of this invention and are not used herein as the reactive ingredient polyol source as used in the Flanders patent discussed above.

Suitable organophosphates are of the general formula $(R^4O)_3P=O$ where $R^4$ is selected independently each time it occurs from the group consisting of alkyl having 1 to 10 carbon atoms inclusive and preferably 1 to 4 carbon atoms inclusive; and alkoxy alkyl with the alkoxy having 1 to 4 carbon atoms and the alkyl having 1 to 4 carbon atoms. Some preferred examples include tributyl phosphate and tributoxy ethyl phosphate.

The organophosphorus additive of this invention must include at least one of the above described additives and mixtures of these additives can be used.

The flame laminatable polyether urethane foam composition of this process can further comprise a halogenated flame retardant. The use of such a flame retardant appears to serve as a processing aid with certain observable improvements in the process of making flame laminatable foams, e.g., control of the rate of adhesive formed during flame lamination. The addition of the halogenated flame retardant by itself, without the inclusion of at least one of the other additives described above, will not render the foam heat laminatable but appears to act as a processing aid and/or controller when used with the above described additives. The halogenated flame retardant ingredient used in the compositions and processes of this invention can be selected from conventional polyurethane flame retardant agents. The term "halogenated flame retardant" as used in the context of this invention includes halogenated hydrocarbons and halogenated organophosphorus compounds.

Suitable halogenated flame retardants are, e.g., tris(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis-(chloromethyl)-1,3-propylene, bis-di(2-chloroethyl)phosphate, bis(dichloropropyl)tribromoneopentylphosphate, tetrakis(2-chloroethyl)ethylene diphosphate, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

The amount of additive used in the compositions and processes of this invention is an amount sufficient to give the flame laminatable property to the resulting polyether urethane foam. However, amounts ranging from 1 part to 10 parts by weight per 100 parts by weight of the polyether polyol can be used, with from 3 parts to 8 parts by weight per 100 parts by weight of the polyether polyol being preferred.

Similarly, the amount of halogenated flame retardant used is an amount effective to enhance the flame laminatable characteristics of the resulting polyether urethane foam. The foam composition can optionally include this halogenated flame retardant. From 5 parts to 20 parts by weight per 100 parts by weight of the polyether polyol can be used, with from 5 parts to 15 parts by weight per 100 parts by weight of the polyether polyol being preferred.

The additive used in this invention can be a premixed, storage stable composition of matter suitable for addition to a foam-forming reaction system to impart the desired flame laminatable characteristic. When the halogenated flame retardant is included in this mixture, the additional quality of flame retardance is imparted to the resulting product. A variety of optional ingredients can be added to the additive combination. For example, the combination can include the polyether polyol, solvents, diluents, colorants, stabilizers, cell openers, lubricants, biocides, etc. Normally, the isocyanate reactant cannot be included in the mixture. The additive can be used by mixing it in any order with the polyurethane foam-forming ingredients either prior to or at the time of reaction.

A laminated structure has also been discovered which comprises at least one layer of a flexible polyether urethane foam heat sealed to a substrate. This flexible polyether urethane foam is of the composition disclosed above.

The substrates which can be employed include spun, woven, knitted, felted, matted and the like textile fabrics produced from natural and synthetic fibers such as cotton, wool, silk, linen, jute, hemp, sisal, nylon, polyester, polyacrylonitrile, vinylchloride-acrylonitrile copolymer, rayon, polyurethane spandex and the like. Other useful substrates include plastic film prepared from polyvinylchloride, vinylchloride-vinyl acetate copolymers, vinylidene chloride homopolymers and copolymers, cellophane, polyethylene, polypropylene, polystyrene and the like. Preferred substrates include fabrics, particularly cotton fabrics, and films produced from vinylchloride polymers (both homopolymers and copolymers).

This invention further contemplates a process for rendering the polyether urethane foam flame laminatable by incorporating therein an effective amount of the additive discussed above. The halogenated flame retardant can also be optionally added. The invention also contemplates the process for producing the laminated structure which comprises heat sealing the substrate to the polyether urethane foam, said foam being produced as described above.

The laminates of this invention can be produced by heating part or all of the surface of the urethane foam described above to a temperature above the fusion temperature of the foam to form a tacky liquid or semiliquid layer, and thereafter or at the same time with the heating operation, applying the substrate to the tacky surface of the foam and holding in contact therewith while cooling until the surface cools and resolidifies, thereby forming an adhesive bond between the foam and the substrate. The fusion temperature of the foam can vary depending upon the nature and amount of the components therein, but in general can range from about 205°

C. to about 316° C. It is generally desirable not to heat the surface of the foam to a temperature higher than about 38° C. above the fusion temperature of the particular foam. In keeping the substrate in contact with the fused surface of the foam until the surface has cooled and resolidified, it is desirable to employ a moderate

EXAMPLES 1–10

These examples describe the batch preparation of flexible polyurethane foams by the "one shot" method. The ingredients used and the test results are summarized in Table I.

TABLE I

| | Examples - Parts by Weight | | | | | | | | | |
|---|---|---|---|---|---|---|---|---|---|---|
| | 1 | 2 | 3 | 4 | 5 | 6 | 7 | 8 | 9 | 10 |
| Basic Ingredients | | | | | | | | | | |
| Niax 16-56 polyether polyol sold by Union Carbide Corp. | 100 | 100 | 100 | 100 | 100 | 100 | 100 | 100 | 100 | 100 |
| 80/20 Toluene diisocyanate | 51.0 | 51.0 | 51.0 | 51.0 | 51.0 | 51.0 | 51.0 | 51.0 | 51.0 | 51.0 |
| L-5740 Silicone sold by Union Carbide Corp. | 1.4 | 1.4 | 1.4 | 1.4 | 1.4 | 1.4 | 1.4 | 1.4 | 1.4 | 1.4 |
| N—ethylmorpholine | 1.3 | 1.3 | 1.3 | 1.3 | 1.3 | 1.3 | 1.3 | 1.3 | 1.3 | 1.3 |
| Stannous octoate | 0.21 | 0.21 | 0.21 | 0.21 | 0.21 | 0.21 | 0.21 | 0.21 | 0.21 | 0.21 |
| Methylene Chloride | 1.50 | 1.50 | 1.50 | 1.50 | 1.50 | 1.50 | 1.50 | 1.50 | 1.50 | 1.50 |
| Water | 3.85 | 3.85 | 3.85 | 3.85 | 3.85 | 3.85 | 3.85 | 3.85 | 3.85 | 3.85 |
| Additives | | | | | | | | | | |
| Fyrol ® FR-2 flame retardant, product of Stauffer Chemical Co., tri(1,3-dichloropropyl)-phosphate | — | 15 | 15 | — | — | — | — | — | — | — |
| Diiosdecyl pentaerythritol diphosphite | — | — | 5 | — | — | — | — | — | — | — |
| Tris(dipropyleneglycol) phosphite | — | — | — | 5 | — | — | — | — | — | — |
| Tris(mono-dinonylphenyl) phosphite | — | — | — | — | 5 | — | — | — | — | — |
| Tri(beta-chloroethyl)phosphite | — | — | — | — | — | 5 | — | — | — | — |
| Di(polyoxyethylene) hydroxymethyl phosphonate (Victastab ® HMP brand of Stauffer Chemical Co.) | — | — | — | — | — | — | 5 | — | — | — |
| Diethyl N,N—bis(2-hydroxyethyl) aminomethyl phosphonate (Fyrol ® 6 flame retardant, product of Stauffer Chemical Co.) | — | — | — | — | — | — | — | 5 | — | — |
| Tributoxy ethyl phosphate | — | — | — | — | — | — | — | — | 5 | — |
| Tributyl phosphate | — | — | — | — | — | — | — | — | — | 5 |
| Results Flame laminate bond strength | N[a] | P[a] | E[a] | E[a] | E[a] | E[a] | E[a] | E[a] | F[a] | F[a] |

[a]N designates none; P designates poor; F designates fair; and E designates excellent flame laminate bond strength.

amount of pressure to maintain the foam and substrate in contact. This pressure can be as low as that resulting from the weight of the foam or the substrate, but is preferably of the order of from about 0.1 to about 100 or more pounds per square inch (metric equivalent).

The heat can be applied to the surface of the foam by any convenient means, for example, a flame, a hot surface such as a "hot plate", infrared heating, and the like. However, this invention is particularly useful in flame lamination.

The laminated structures of this invention are widely useful compositions. For example, the fabric urethane foam laminates are useful in the production of padded clothing, insulation, cushions and the like. The laminates are generally widely useful in the production of cushioning, heat and sound insulation, crash pads and the like.

The following examples describe various embodiments of the invention. Other embodiments will be apparent to one of ordinary skill in the art from a consideration of this specification or practice of the invention disclosed herein. It is intended that the specification and examples be considered as exemplary only, with the true scope and spirit of the invention being indicated by the claims which follow the examples.

The foams of Examples 1–10 were each prepared by the same method using the same basic ingredients. The toluene diisocyanate ingredient was added to the mixture of the other ingredients in the formulation. A typical density of the polyether urethane formulation was 1.5 pcf (metric equivalent?)

The resulting foams were sliced into ¼" (0.635 cm) thick 4"×4" (10.16 cm×10.16 cm) specimens. A bunsen burner, equipped with a wing top and using propane gas, was used as the flaming source. A blue flame was used. The flame was applied to the surface of each foam for a time sufficient to melt the top surface of the foam to provide a liquid. The back of the fabric was then pressed against the melted foam surface with sufficient pressure to ensure good contact. A laminate resulted. This laminate was allowed to cool to room temperature.

The bond strength of the cooled laminate was tested by a tugging attempt to separate the fabric from the foam. The flame laminate bond strength was rated as excellent when the bond strength approached the tensile strength of the original foam.

The foam of Example 1 was the control which did not contain any additives. The foam of Example 2 contained only the halogenated flame retardant. The foam of Example 1 exhibited no bond strength whereas the foam of Example 2 exhibited some bond strength but this was rated as poor. The foam of Example 3 contained both the halogenated flame retardant and diisodecyl pentaerythritol diphosphite and exhibited excellent bond strength.

The foams of Examples 4 to 10 each contained one additive selected from either an organophosphite, and organophosphonate or an organophosphate. These foams all exhibited fair to excellent bond strengths. Generally, the organophosphites were judged to exhibit better bond strength than the organophosphonates, which in turn exhibited better bond strength than the organophosphates.

What is claimed is:

1. A heat laminatable polyether flexible urethane foam composition which comprises at least one organophosphorus additive, said additive being present in an amount effective to impart heat laminatable properties to the resulting foam and wherein the organophosphorus additive is an organophosphite.

2. The composition of claim 1 wherein the organophosphite is selected from the group consisting of diphosphites, pentaerythritol diphosphites, alkyl phosphites and aryl phosphites.

3. A heat laminatable polyether flexible urethane foam composition which comprises at least one organophosphorus additive, said additive being present in an amount effective to impart heat laminatable properties to the resulting foam and wherein the organophosphorus additive is a hydroxyalkylaminoalkylphosphonate.

4. The composition of claim 3 wherein the organophosphorus additive is a hydroxyalkylaminoalkylphosphonate selected from the group consisting of diisopropyl-N,N-bis(2-hydroxyethyl)aminomethyl phosphonate and diethyl-N,N-bis(2-hydroxyethyl)aminomethyl phosphonate.

5. The composition of claim 1 which further comprises an halogenated flame retardant.

6. The composition of claim 2 which further comprises an halogenated flame retardant.

7. The composition of claim 3 which further comprises an halogenated flame retardant.

8. The composition of claim 4 which further comprises an halogenated flame retardant.

9. The composition of claim 5 wherein the halogenated flame retardant is selected from the group consisting of tris(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis-(chloromethyl)-1,3-propylene, bis-di(2-chloroethyl)phosphate, bis((dichloropropyl)tribromoneopentyl)phosphate, tetrakis(2-chloroethyl)ethylene diphosphate, pentabromodiphenyl oxide, bis(penta-bromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

10. A process for rendering polyether flexible urethane foam flame laminatable which comprises incorporating therein an effective amount of an organophosphorus additive, said additive being an organophosphite.

11. The process of claim 10 wherein the organophosphite is selected from the group consisting of diphosphites, pentaerythritol diphosphites, alkyl phosphites and aryl phosphites.

12. A process for rendering polyether flexible urethane foam flame laminatable which comprises incorporating therein an effective amount of an oganophosphorus additive, said additive being a hydroxyalkylaminoalkylphosphonate.

13. The process of claim 12 wherein the organophosphorus additive is a hydroxyalkylaminoalkylphosphonate selected from the group consisting of diisopropyl-N,N-bis(2-hydroxyethyl)aminomethyl phosphonate, diethyl-N,N-bis(2-hydroxyethyl)aminomethyl phosphonate and mixtures thereof.

14. The process of claim 10 which further comprises incorporating therein an effective amount of an halogenated flame retardant.

15. The process of claim 11 which further comprises incorporating therein an effective amount of an halogenated flame retardant.

16. The process of claim 12 which further comprises incorporating therein an effective amount of an halogenated flame retardant.

17. The process of claim 13 which further comprises incorporating therein an effective amount of an halogenated flame retardant.

18. The process of claim 14 wherein the halogenated flame retardant is selected from the group consisting of tris(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis-(chloromethyl)-1,3-propylene, bis-di(2-chloroethyl)phosphate, bis((dichloropropyl)tribromoneopentyl)phosphate, tetrakis(2-chloroethyl)ethylene diphosphate, pentabromodiphenyl oxide, bis(penta-bromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

* * * * *